(12) United States Patent
Herron

(10) Patent No.: US 6,242,120 B1
(45) Date of Patent: Jun. 5, 2001

(54) SYSTEM AND METHOD FOR OPTIMIZING FUEL CELL PURGE CYCLES

(75) Inventor: Thomas G. Herron, Bend, OR (US)

(73) Assignee: IdaTech, LLC, Bend, OR (US)

( * ) Notice: Subject to any disclaimer, the term of this patent is extended or adjusted under 35 U.S.C. 154(b) by 0 days.

(21) Appl. No.: 09/414,048

(22) Filed: Oct. 6, 1999

(51) Int. Cl.[7] ................................................. H01M 8/04
(52) U.S. Cl. ................................................................ 429/22
(58) Field of Search ................................ 429/22, 23, 13

(56) References Cited

U.S. PATENT DOCUMENTS

| | | |
|---|---|---|
| Re. 35,002 | 7/1995 | Matsubara et al. . |
| Re. 36,148 * | 3/1999 | Strasser .................... 429/13 |
| 3,765,946 | 10/1973 | Werner et al. . |
| 3,955,941 | 5/1976 | Houseman et al. . |
| 4,098,959 * | 7/1978 | Fanciullo ................. 429/25 |
| 4,098,960 * | 7/1978 | Gagnon .................... 429/25 |
| 4,533,607 | 8/1985 | Sederquist . |
| 4,642,273 | 2/1987 | Sasaki . |
| 4,781,241 | 11/1988 | Misage et al. . |
| 4,788,004 | 11/1988 | Pinto et al. . |
| 5,030,661 | 7/1991 | Lywood . |
| 5,200,278 * | 4/1993 | Watkins .................... 429/24 |
| 5,366,818 * | 11/1994 | Wilkinson ............... 429/13 |
| 5,366,821 | 11/1994 | Merritt et al. . |
| 5,401,589 | 3/1995 | Palmer et al. . |
| 5,417,051 | 5/1995 | Ankersmit et al. . |
| 5,478,662 * | 12/1995 | Strasser ................... 429/13 |
| 5,509,942 | 4/1996 | Dodge . |
| 5,527,632 | 6/1996 | Gardner . |
| 5,631,820 | 5/1997 | Donnelly et al. . |
| 5,637,414 | 6/1997 | Inoue et al. . |
| 5,658,681 | 8/1997 | Sato et al. . |
| 5,763,113 | 6/1998 | Meltser et al. . |
| 5,771,476 | 6/1998 | Mufford et al. . |
| 5,780,179 | 7/1998 | Okamoto . |
| 5,798,186 | 8/1998 | Fletcher et al. . |
| 5,821,185 | 10/1998 | White et al. . |
| 5,897,970 | 4/1999 | Isomura et al. . |
| 6,022,634 | 2/2000 | Ramunni et al. . |
| 6,042,956 | 3/2000 | Lenel . |
| 6,045,933 | 4/2000 | Okamoto . |
| 6,054,229 | 4/2000 | Hsu et al. . |
| 6,120,923 | 9/2000 | Van Dine et al. . |

FOREIGN PATENT DOCUMENTS

| | | |
|---|---|---|
| WO 99/65097 | 12/1999 | (WO) . |
| WO 00/02282 | 1/2000 | (WO) . |

OTHER PUBLICATIONS

English language abstract of Japanese Patent No. 6176779, 1994.

English language abstract of Japanese Patent No. 7057758, 1995.

* cited by examiner

*Primary Examiner*—Carol Chaney
*Assistant Examiner*—Mark Ruthkosky
(74) *Attorney, Agent, or Firm*—Kolisch, Hartwell, Dickinson, McCormack & Heuser, P.C.

(57) ABSTRACT

A system for optimizing the purge cycle of a fuel cell stack responsive to the performance of the fuel cell. The system includes a controller that measures a process parameter indicative of the rate at which water is being produced in the fuel cell. If the measured value exceeds a threshold value, then the purge assembly is automatically actuated.

29 Claims, 2 Drawing Sheets

SYSTEM AND METHOD FOR OPTIMIZING FUEL CELL PURGE CYCLES

FIELD OF THE INVENTION

The present invention relates generally to fuel cell systems, and more particularly to a system and method for optimizing the purge cycle of a fuel cell stack.

BACKGROUND AND SUMMARY OF THE INVENTION

An electrochemical fuel cell is a device that reacts a fuel source with an oxidizing agent to produce an electric current. Commonly, the fuel source is a source of protons, such as hydrogen gas, and the oxidizing agent is oxygen. An example of a fuel cell utilizing these reactants is a proton exchange membrane (PEM) fuel cell, in which hydrogen gas is catalytically dissociated in the fuel cell's anode chamber into a pair of protons and electrons. The liberated protons are drawn through an electrolytic membrane into the fuel cell's cathode chamber. The electrons cannot pass through the membrane and instead must travel through an external circuit to reach the cathode chamber. In the cathode chamber, the protons and electrons react with oxygen to form water and heat. The net flow of electrons from the anode to the cathode chambers produces an electric current, which can be used to meet the electrical load being applied to the fuel cell by an associated electrical device, such as a vehicle, boat, generator, household, etc.

The fuel cell's ability to transport hydrogen ions across the membrane is a function of the hydration of the membrane. Preferably, the membrane is at or near saturation with water absorbed into the membrane, and this water conducts the hydrogen ions across the membrane. To achieve this desired level of saturation, the anode chamber is preferably at or near 100% relative humidity. However, at this level of humidity, water will tend to condense in the anode chamber. This water also must be periodically removed to prevent the operation of the fuel cell from being impaired. Too much water in the anode chamber will reduce the efficiency of the fuel cell because the water molecules will block the reacting sites of the anode and prevent hydrogen ions from reaching and being transported through the membrane.

In the cathode chamber, water is more prevalent because it is a byproduct of the reaction occurring at the cathode. In addition, water molecules are transported through the membrane with the protons, resulting in additional liquid water in the cathode chamber. When this flooding of the cathode chamber occurs and water droplets prevent oxygen molecules from reaching the cathode, the operation and efficiency of the fuel cell are impaired.

Therefore, there is a need to remove water from the chambers of the fuel cell. Typically, water is removed through periodic purging of either or both of the chambers through purge valves. These valves are briefly opened after a defined period of time elapses to depressurize the chamber. Accumulated water in the purged chamber is expelled with the gases in the chamber.

A problem with the conventional method of purging a fuel cell based on elapsed time is that the rate of water production is not proportional to the time elapsed since the fuel cell was last purged. For example, if the fuel cell is producing current at its maximum rate, it will produce and accumulate more water, and therefore require more frequent purging, than when producing current at a lower, or even nominal rate. Because the time interval at which the fuel cell is purged is fixed, sometimes the interval will be shorter than an optimum interval. Other times, it will be longer than the optimum interval.

Too infrequent purging of the fuel cell results in accumulation of water within the fuel cell, thereby producing the flooding and other undesirable conditions described above. Too frequent purging of the fuel cell will remove too much water, which will result in the drying of the membrane. As the membrane dries, its resistance increases, requiring more power to transport hydrogen ions across the membrane. This reduces the efficiency of the fuel cell. Another disadvantage of too frequent purging of the anode chamber is that hydrogen gas is exhausted when the anode chamber is purged. Since hydrogen is essentially the fuel required to produce current with the fuel cell, it can be understood that unnecessary purging of the anode chamber wastes fuel that could be otherwise used to produce an electric current in the fuel cell.

Neither of these conditions is desirable, so the fuel cell is conventionally purged based on a timed interval corresponding to an average rate of usage. For example, it may be purged for one-half of a second every thirty seconds of operation. As discussed, this purge cycle will be too infrequent for some operating states and too often for others.

Therefore, there is a need to optimize the purge cycle of a fuel cell, or fuel cell stack, based on the operating state of the fuel cell by correlating the purging of the fuel cell with the rate at which water is produced in the fuel cell. The invention described herein provides a system and method for optimizing the purge cycle of a fuel cell responsive to the performance of the fuel cell, thereby removing the problems encountered with too frequent or infrequent purging of the fuel cell. The system detects the value of a process parameter representative of the fuel cell's performance, and automatically actuates the fuel cell's purge assembly when this value exceeds a determined threshold value.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION AND BEST MODE OF THE INVENTION

Figure 1:
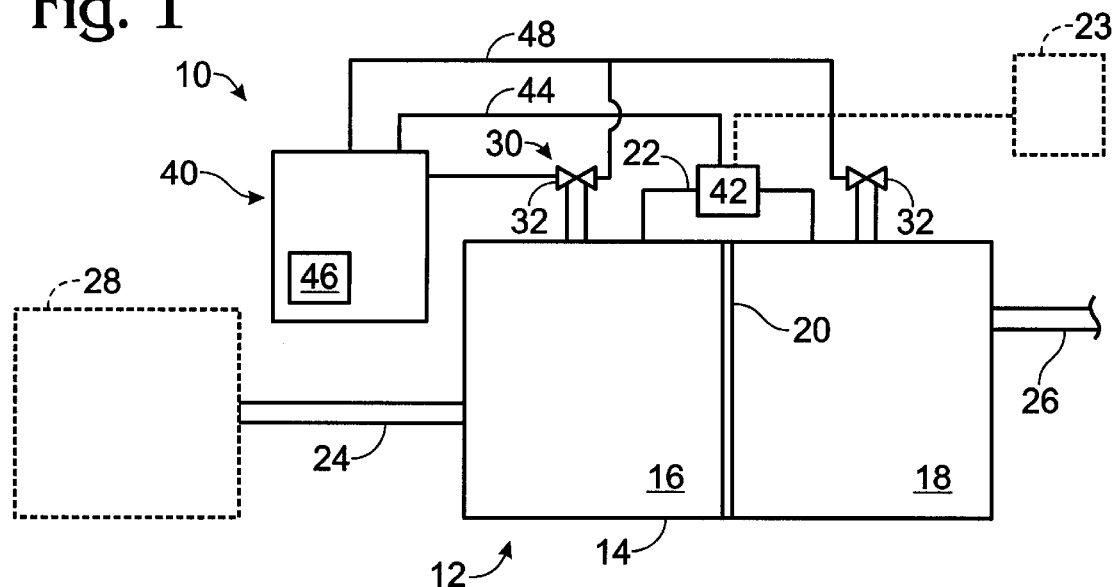
FIG. 1 is a schematic diagram of a fuel cell system constructed according to the present invention.

A fuel cell system according to the present invention is schematically illustrated in FIG. 1 and generally indicated at 10. System 10 includes a fuel cell stack 12 consisting of one or more fuel cells 14. The number of cells in the stack may vary, depending upon such factors as the desired power output, the size limitations of the system, and the maximum available hydrogen supply. As used herein, the term fuel cell stack may refer to either a single cell or multiple fuel cells operatively coupled together.

Each fuel cell 14 includes anode and cathode chambers 16 and 18 separated by an electrolytic membrane 20 through which hydrogen ions may pass. Each chamber includes one or more electrodes (not shown). Electrons liberated from the hydrogen gas cannot pass through membrane 20, and instead must pass through an external circuit 22. This flow of electrons produces an electric current, which may be used to meet the electrical load applied to an associated electric device, such as shown at 23, as well as to power the operation of the fuel cell system.

Hydrogen and oxygen gases are respectively delivered to the anode and cathode chambers through hydrogen and oxygen feeds 24 and 26. Oxygen may be supplied in a purified form, but typically will be supplied in the form of air, such as by a blower. The relative flow rate of air will be greater than that of pure oxygen because of the lower relative concentration of oxygen atoms provided.

One suitable source of hydrogen gas is the product stream from a fuel processor, which produces hydrogen by reacting steam with an alcohol or hydrocarbon vapor (steam reforming), or by partial oxidation of a hydrocarbon or alcohol vapor, or by a combination of partial oxidation and steam reforming a hydrocarbon or an alcohol vapor, or by pyrolysis of a hydrocarbon or alcohol vapor. It is within the scope of the present invention that system 10 may include a fuel processor, such as shown in FIG. 1 in dashed lines at 28. In such an embodiment, the system is more commonly referred to as a fuel processing system. Examples of suitable fuel processors are disclosed in U.S. patent application Ser. No. 09/291,447, the disclosure of which is hereby incorporated by reference. It is within the scope of the present invention that any other type of fuel processor may be used, such as those discussed above, and that any other suitable source of hydrogen gas may be used. Examples of other sources of hydrogen include a storage device, such as a storage tank or hydride bed, containing a stored supply of hydrogen gas.

Fuel cell system 10 further includes a purge assembly 30 including at least one purge valve 32 that may be selectively opened to depressurize the fuel cells and thereby exhaust gases and water built up within the anode and/or cathode chambers. Purge assembly 30 may include one or more subassemblies, each containing one or more purge valves. Any suitable valve may be used, however, normally closed solenoid valves have proven effective. As shown, both the anode and cathode chambers include at least one purge valve, however, it is within the scope of the present invention that only one of the chambers of each cell is purged. Similarly, when fuel cell stack 12 includes multiple fuel cells 14, each cell may contain its own purge valve(s), or the cells may be purged in selected groups or all together.

System 10 further includes a controller 40 that communicates, via a communication line 44, with a sensor, or sensor assembly, 42 adapted to measure the value of a process parameter that is representative of the performance of system 10. The communication lines described herein may be any suitable linkage for sending and/or receiving signals between the associated elements of the system. For example, any suitable mechanical linkage, or wired or wireless electronic linkage may be used.

The process parameter may be any quantitative measurement of the performance of the fuel cell stack, such as the relative rate at which water is being generated in the fuel cell stack due to operation of the fuel cell stack during an operative cycle, with an operative, or purge, cycle being the period of operation between purges. Examples of suitable process parameters include the cumulative amp-hours of current produced during an operative cycle and the power (e.g., kWh) produced during an operative cycle. These parameters are suitable because they will change proportional to the degree to which the fuel cell is operating to produce an electrical current and will not markedly change when the system is in an idle or shut down mode of operation. These variables are contrasted with time, which is not directly related to the rate at which the fuel cell is producing current, and thereby producing water. Any other suitable process parameter meeting the condition of being correlated to the performance of the fuel cell stack, such as the rate of hydrogen consumption by the fuel cell stack, may be used and is within the scope of the present invention.

Figure 2:
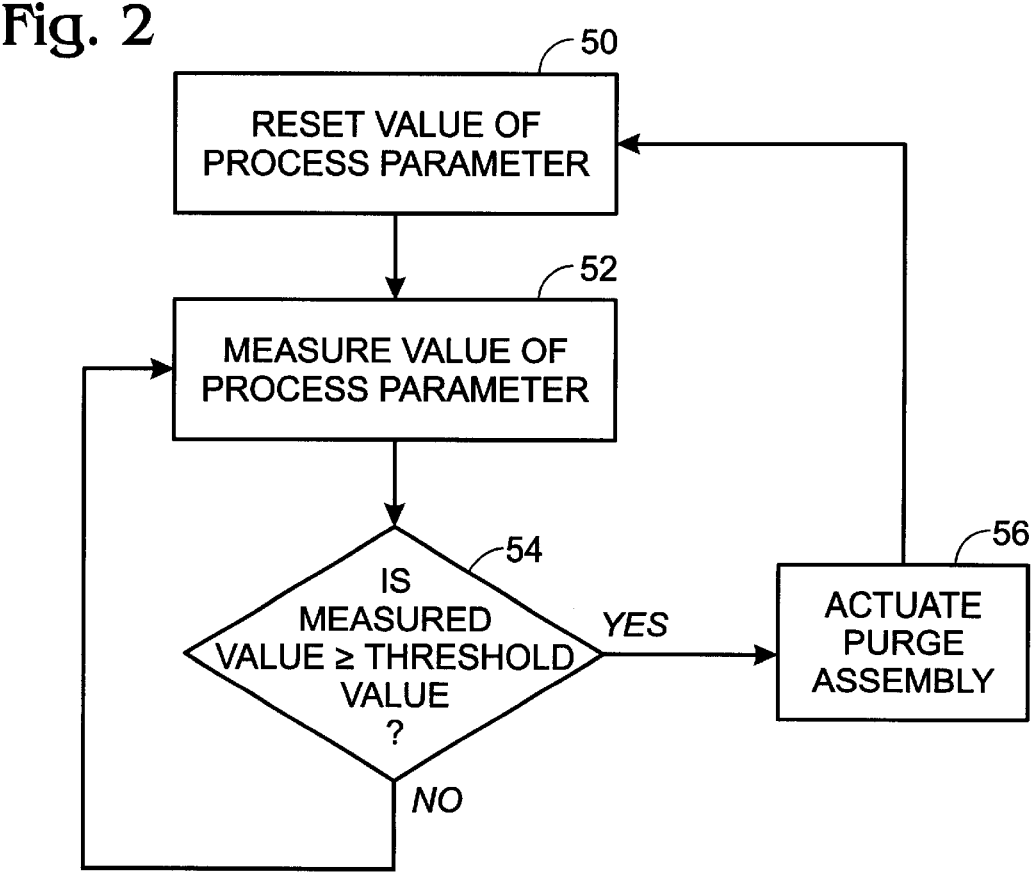
FIG. 2 is a flow diagram showing a method for optimizing the purge cycle of a fuel cell system according to the present invention.

Controller 40 includes a memory device 46 in which a threshold value for the process parameter is stored. The memory device may include volatile and nonvolatile portions. The threshold value will typically be stored in a nonvolatile portion of the memory device so that it does not need to be reentered should the fuel cell be shut down or lose power. Other stored values, such as the subsequently discussed cumulative value of the process parameter, may be stored in the volatile component because they are periodically reset and only temporarily stored. Controller 40 automatically actuates the purge assembly if the value of the process parameter meets or exceeds the threshold value. For example, the controller may communicate with the purge assembly via communication line 48. The operative steps in this process are shown in FIG. 2.

At 50, any residual or previously stored value of the process parameter is reset, and then at 52, the current value of the parameter is measured or detected, such as with sensor 44. This measured value is communicated to the controller. It should be understood that sensor 44 may, but does not necessarily, include a transducer in communication with the controller. The controller may also include one or more transducers adapted to receive and interpret the signal from the sensor. At 54, the controller compares the value of the process parameter to a determined threshold value, such as may be stored in memory device 46. If the value of the process parameter is at least as large as the threshold value, then at 56, the controller actuates the purge assembly and steps 50–54 are repeated. If the value of the process parameter does not exceed the threshold value, then steps 52–54 are repeated.

Figure 3:
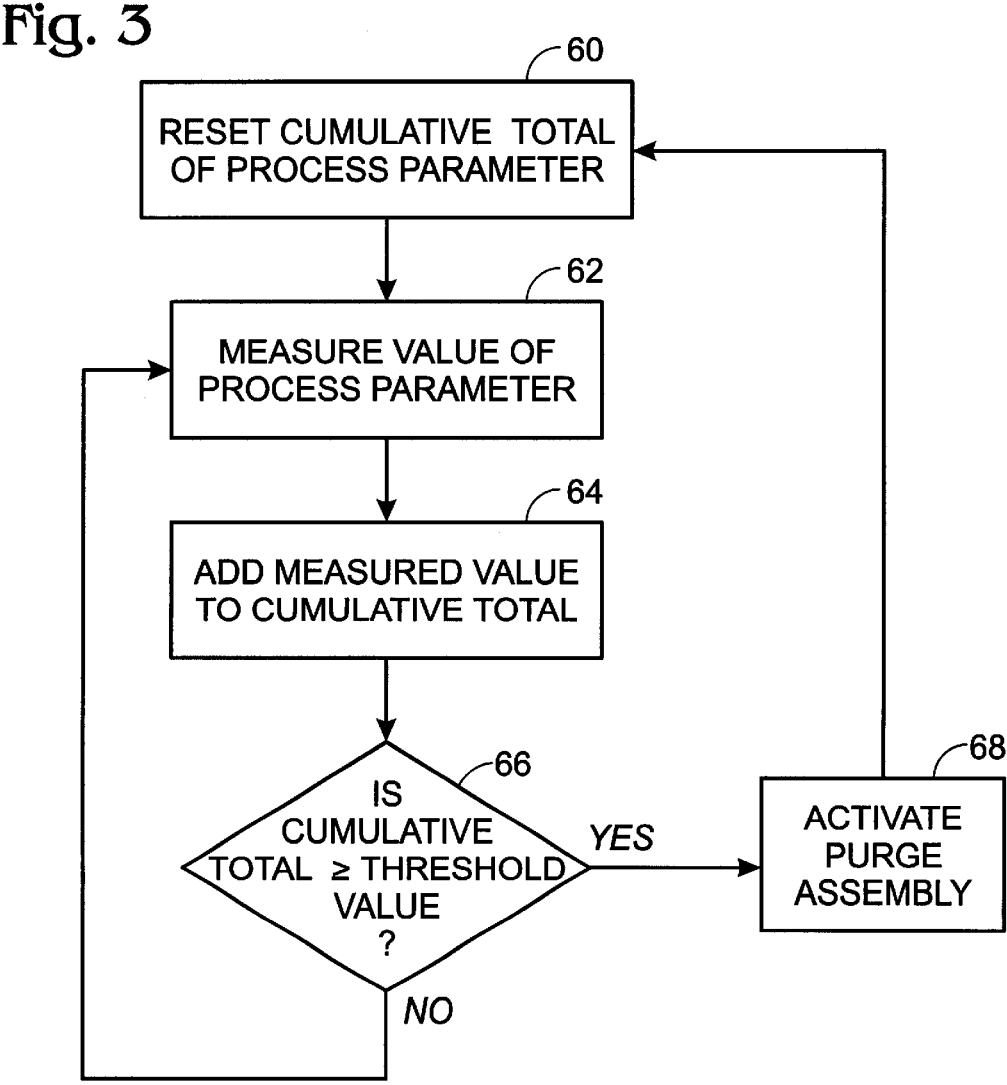
FIG. 3 is a flow diagram for another method for optimizing the purge cycle of a fuel cell system according to the present invention.

The value of the process parameter may be a cumulative value, such as a running total in which each periodic measurement is added to the existing total. When this total meets or exceeds the threshold value, then the purge assembly is automatically actuated and the total is reset. A flow diagram illustrating this method is shown in FIG. 3. As shown, the cumulative total value of the process parameter is reset at 60. At 62, the value of the process parameter is measured, and at 64, this measured value is added to the cumulative total value. This running total may be stored, for example, in the controller's memory device. At 66, the cumulative total is compared to the stored threshold value, and if the total is at least as large as the stored threshold value, then the purge assembly is actuated at 68 and the process starts over. If not, steps 62–66 are repeated.

In the above discussion, the purge assembly is automatically actuated if the cumulative or instantaneous value of the process parameter is at least as great as the stored threshold value. It should be understood that any desired relationship between these values may be used and is within the scope of the present invention. For example, the controller may be configured to actuate the purge assembly if the value is equal to the threshold value, greater than the threshold value, within a selected percentage of the threshold value, greater than or equal to the threshold value for a determined number of consecutive measurements, etc. Therefore, the system may be described as being purged if the measured value exceeds a determined value, with the determined value being the minimum value required to cause the controller to actuate the purge assembly. Therefore, the determined value may a value equal to the stored value, a value that exceeds the stored value, a value that is within a selected percentage of the stored value, etc.

Although the preceding discussion describes actuating the purge assembly if the value of the process parameter equals or exceeds a threshold or other determined value, it is within the scope of the present invention that the controller may be adapted to actuate the purge assembly if any other selected relationship exists between the measured value and a selected or stored value. For example, in some embodiments of the invention, it may be desirable to measure a value of a process parameter and actuate the purge assembly if this value is less than a determined value.

Although discussed above in terms of a PEM fuel cell, it is within the scope of the present invention that controller 40 may be implemented with other forms of fuel cells. For example, the system may be implemented with other low temperature fuel cells, such as alkaline fuel cells. The invented system and method may also be implemented with high temperature fuel cells, in which there is a need to periodically purge the fuel cell to exhaust accumulated inert gases, such as nitrogen or methane.

Figure 4:
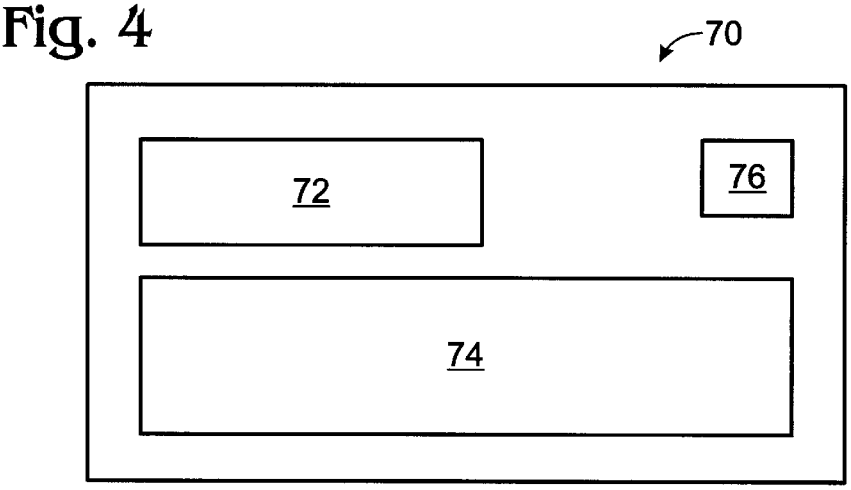
FIG. 4 is a schematic front elevation view of a user interface for the controller of the fuel cell system of FIG. 1.

Controller 40 may be implemented with either a digital or an analog circuit, or a combination of the two. For example, the controller may include software executing on a processor, or it may be an analog circuit. Regardless of how controller 40 is implemented, it is preferable, but not required or essential, that the controller includes a user interface. An example of a user interface is schematically shown in FIG. 4 and indicated generally at 70. Interface 70 enables a user to monitor and/or interact with the operation of the controller.

As shown, interface 70 includes a display region 72 in which information is presented to the user. For example, display region 72 may display the current value of the process parameter and the threshold value. When the method of FIG. 3 is utilized, the display region may also include the cumulative total value of the process parameter. It should be understood that other information regarding the operation and performance of the fuel cell system may also be displayed in region 72. For example, display 72 may display such information as the current time and the elapsed time since the purge assembly was last actuated. Also shown in FIG. 4 is a user input device 74 through which a user communicates with the controller. For example, input device 74 may enable a user to adjust the threshold value and/or to select a process parameter to be used from an array of suitable variables. Input device 74 may include any suitable device for receiving user inputs, including rotary dials and switches, push-buttons, keypads, keyboards, a mouse, touch screens, etc.

Also shown in FIG. 4 is a user input device 76 that signals the controller to automatically actuate the purge assembly. This permits a user to manually cause the fuel cell stack to be purged, regardless of whether the value of the process parameter exceeds the threshold value. Preferably, actuating input device 76 also resets the value of the process parameter.

It should be understood that it is within the scope of the present invention that the fuel cell system may include a controller without a user interface, and that it is not required for the user interface to include all of the elements described herein. The elements described above have been schematically illustrated in FIG. 4 collectively, however, it is within the scope of the present invention that they may be implemented separately. For example, the user interface may include multiple display regions, each adapted to display one or more of the types of user information described above. Similarly, a single user input device may be used, and the input device may include a display that prompts the user to enter requested values or enables the user to toggle between input screens.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicant regards the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicant's invention.

I claim:

1. A method for controlling the purge cycle of a fuel cell stack, the method comprising:

providing a fuel cell stack including at least one fuel cell adapted to produce an electric current and a purge assembly including at least one purge valve;

measuring a value of a process parameter representative of the performance of the fuel cell stack;

comparing the value of the process parameter to a determined value; and actuating the purge assembly if the value of the process parameter exceeds the determined value.

2. The method of claim 1, wherein the method includes resetting the value of the process parameter upon actuation of the purge assembly.

3. The method of claim 1, wherein the method is a computer-implemented method.

4. The method of claim 1, wherein the fuel cell stack includes at least one proton exchange membrane fuel cell.

5. The method of claim 1, wherein the process parameter includes a variable adapted to change proportional to the performance of the fuel cell stack.

6. The method of claim 5, wherein the process parameter includes a variable adapted to change directly proportional to the performance of the fuel cell stack.

7. The method of claim 1, wherein the process parameter includes a variable adapted to change proportional to the current being produced by the fuel cell stack.

8. The method of claim 1, wherein the process parameter includes the power produced by the fuel cell stack.

9. The method of claim 1, wherein the process parameter includes the rate at which water is generated the fuel cell stack.

10. The method of claim 1, wherein the value of the process parameter is a cumulative value of the process parameter during an operating cycle of the fuel cell stack.

11. A system for controlling the purge cycle of a fuel cell stack, comprising:

a fuel cell stack including at least one fuel cell adapted to receive a flow containing hydrogen gas and produce an electric current therefrom;

a purge assembly including at least one purge valve adapted to selectively purge the fuel cell stack to reduce the concentration of a selected composition therein;

a sensor assembly including at least one sensor adapted to measure a value of a process parameter representative of the performance of the fuel cell stack; and a controller adapted to actuate the purge assembly if the value of the process parameter exceeds a determined value.

12. The system of claim 11, wherein the selected composition is water.

13. The system of claim 11, wherein the controller includes a memory device in which the determined value is stored.

14. The system of claim 11, wherein the controller includes at least one analog circuit for comparing the value of the process parameter to the determined value and actuating the purge assembly if the value of the process parameter exceeds the determined value.

15. The system of claim 11, wherein the controller includes software executing on a processor.

16. The system of claim 11, wherein the fuel cell stack includes at least one proton exchange fuel cell.

17. The system of claim 11, wherein the process parameter includes the current produced by the fuel cell stack during an operative cycle.

18. The system of claim 11, wherein the process parameter includes the power produced by the fuel cell stack during an operative cycle.

19. The system of claim 11, wherein upon actuation of the purge assembly, the controller is adapted to reset the value of the process parameter.

20. The system of claim 11, wherein the controller further includes a user interface adapted to receive user inputs and communicate the user inputs to the controller.

21. The system of claim 20, wherein the user interface is adapted to receive a user input selecting the process parameter to be measured by the sensor assembly.

22. The system of claim 20, wherein the user interface is adapted to receive a user input selecting the determined value.

23. The system of claim 11, wherein the system further includes a fuel processor adapted to produce the flow containing hydrogen gas.

24. The system of claim 11, wherein the system further includes at least one device adapted to apply an electrical load to the fuel cell stack.

25. In a fuel cell stack, an improvement comprising means for measuring a value representative of the current produced by the fuel cell stack during an operating cycle and selectively actuating a purge assembly when the value deviates from a threshold value by more than a selected increment.

26. The improvement of claim 25, wherein the stack includes a user interface adapted to receive a user input corresponding to the selected increment.

27. A fuel cell processing system, comprising:

a fuel cell stack including at least one fuel cell, wherein each fuel cell comprises an anode chamber and a cathode chamber separated by an electrolyte, wherein the anode chamber is adapted to receive a flow containing hydrogen gas and the cathode chamber is adapted to receive a flow containing oxygen gas;

a purge assembly adapted to selectively purge the fuel cell stack; and means for measuring a value of a process parameter representative of the performance of the fuel cell stack and actuating the purge assembly if the value exceeds a determined value.

28. The system of claim 27, wherein the system further includes a fuel processor adapted to produce the flow-containing hydrogen gas.

29. The system of claim 27, wherein the system further includes at least one device adapted to receive an electric current produced by the fuel cell stack.

* * * * *

UNITED STATES PATENT AND TRADEMARK OFFICE
CERTIFICATE OF CORRECTION

PATENT NO. : 6,242,120 B1
DATED : June 5, 2001
INVENTOR(S) : Thomas G. Herron

It is certified that error appears in the above-identified patent and that said Letters Patent is hereby corrected as shown below:

<u>Column 6,</u>
Line 66, following "generated" insert -- in -- therefor.

Signed and Sealed this

Twenty-ninth Day of January, 2002

Attest:

Attesting Officer

JAMES E. ROGAN
*Director of the United States Patent and Trademark Office*